United States Patent

Ichien

(10) Patent No.: US 12,228,927 B2
(45) Date of Patent: Feb. 18, 2025

(54) CONTROL OF HOST VEHICLE OF UNMANNED VEHICLE GROUP BASED ON CONSTRAINT CONDITION, ACTIVITY SITUATION OF HOST VEHICLE, AND ACTIVITY AMOUNT OF HOST VEHICLE

(71) Applicant: NEC Corporation, Tokyo (JP)

(72) Inventor: Masumi Ichien, Tokyo (JP)

(73) Assignee: NEC CORPORATION, Tokyo (JP)

( * ) Notice: Subject to any disclaimer, the term of this patent is extended or adjusted under 35 U.S.C. 154(b) by 385 days.

(21) Appl. No.: 17/773,232

(22) PCT Filed: Nov. 14, 2019

(86) PCT No.: PCT/JP2019/044623
§ 371 (c)(1),
(2) Date: Apr. 29, 2022

(87) PCT Pub. No.: WO2021/095189
PCT Pub. Date: May 20, 2021

(65) Prior Publication Data
US 2023/0012391 A1    Jan. 12, 2023

(51) Int. Cl.
G05D 1/00    (2024.01)

(52) U.S. Cl.
CPC ................ *G05D 1/0088* (2013.01)

(58) Field of Classification Search
CPC .................................. G05D 1/0088
See application file for complete search history.

(56) References Cited

U.S. PATENT DOCUMENTS

| | | | |
|---|---|---|---|
| 10,095,256 B2 * | 10/2018 | Ogawa | G05F 1/66 |
| 11,645,779 B1 * | 5/2023 | Pertsel | G06N 3/045 |
| | | | 382/104 |
| 11,701,972 B1 * | 7/2023 | Chrysanthakopoulos | A01B 79/005 |
| | | | 701/22 |
| 11,738,947 B2 * | 8/2023 | Raizer | G01C 21/206 |
| | | | 701/2 |
| 2010/0178982 A1 * | 7/2010 | Ehrman | A63F 7/0058 |
| | | | 463/37 |

(Continued)

FOREIGN PATENT DOCUMENTS

| JP | 2010-134656 A | 6/2010 |
|---|---|---|
| JP | 2017-519279 A | 7/2017 |

(Continued)

OTHER PUBLICATIONS

International Search Report for PCT Application No. PCT/JP2019/044623, mailed on Feb. 4, 2020.

(Continued)

*Primary Examiner* — Ramsey Refai

(57) ABSTRACT

An unmanned vehicle belongs to an unmanned vehicle group that includes a plurality of unmanned vehicles to control the unmanned vehicle in accordance with the condition of the entire unmanned vehicle group The unmanned device includes a reception means configured to receive a restriction condition pertaining to an amount of activity of the unmanned vehicle group; and a control means configured to control the unmanned vehicle on the basis of the restriction condition received by the reception means and the activity condition of the unmanned vehicle.

8 Claims, 16 Drawing Sheets

(56) References Cited

U.S. PATENT DOCUMENTS

| | | | | |
|---|---|---|---|---|
| 2013/0289785 A1* | 10/2013 | Takahashi | ............. | G06Q 50/06 |
| | | | | 700/286 |
| 2014/0217824 A1* | 8/2014 | Joko | ................ | H02J 13/00004 |
| | | | | 307/35 |
| 2016/0091914 A1* | 3/2016 | Ogawa | ............. | H02J 13/00001 |
| | | | | 700/291 |
| 2017/0072565 A1 | 3/2017 | Egerstedt et al. | | |
| 2017/0123421 A1* | 5/2017 | Kentley | .............. | G05D 1/0088 |
| 2017/0131727 A1* | 5/2017 | Kurdi | ................... | G05D 1/0027 |
| 2018/0074516 A1 | 3/2018 | Ogawa et al. | | |
| 2018/0143312 A1* | 5/2018 | High | .................... | G05D 1/0261 |
| 2018/0178741 A1* | 6/2018 | Poeppel | ............. | B60R 16/0236 |
| 2019/0138019 A1 | 5/2019 | Hayashi | | |
| 2019/0354113 A1 | 11/2019 | Ogawa et al. | | |
| 2020/0324970 A1* | 10/2020 | Raizer | ................... | H02J 7/0048 |
| 2021/0240182 A1* | 8/2021 | Brandon | ............. | G05D 1/0278 |

FOREIGN PATENT DOCUMENTS

| | | |
|---|---|---|
| JP | 2019-101770 A | 6/2019 |
| WO | 2014/208299 A1 | 12/2014 |
| WO | 2016/166983 A1 | 10/2016 |
| WO | 2018/012446 A1 | 1/2018 |
| WO | 2018/105599 A1 | 6/2018 |

OTHER PUBLICATIONS

English translation of Written opinion for PCT Application No. PCT/JP2019/044623, mailed on Feb. 4, 2020.

\* cited by examiner

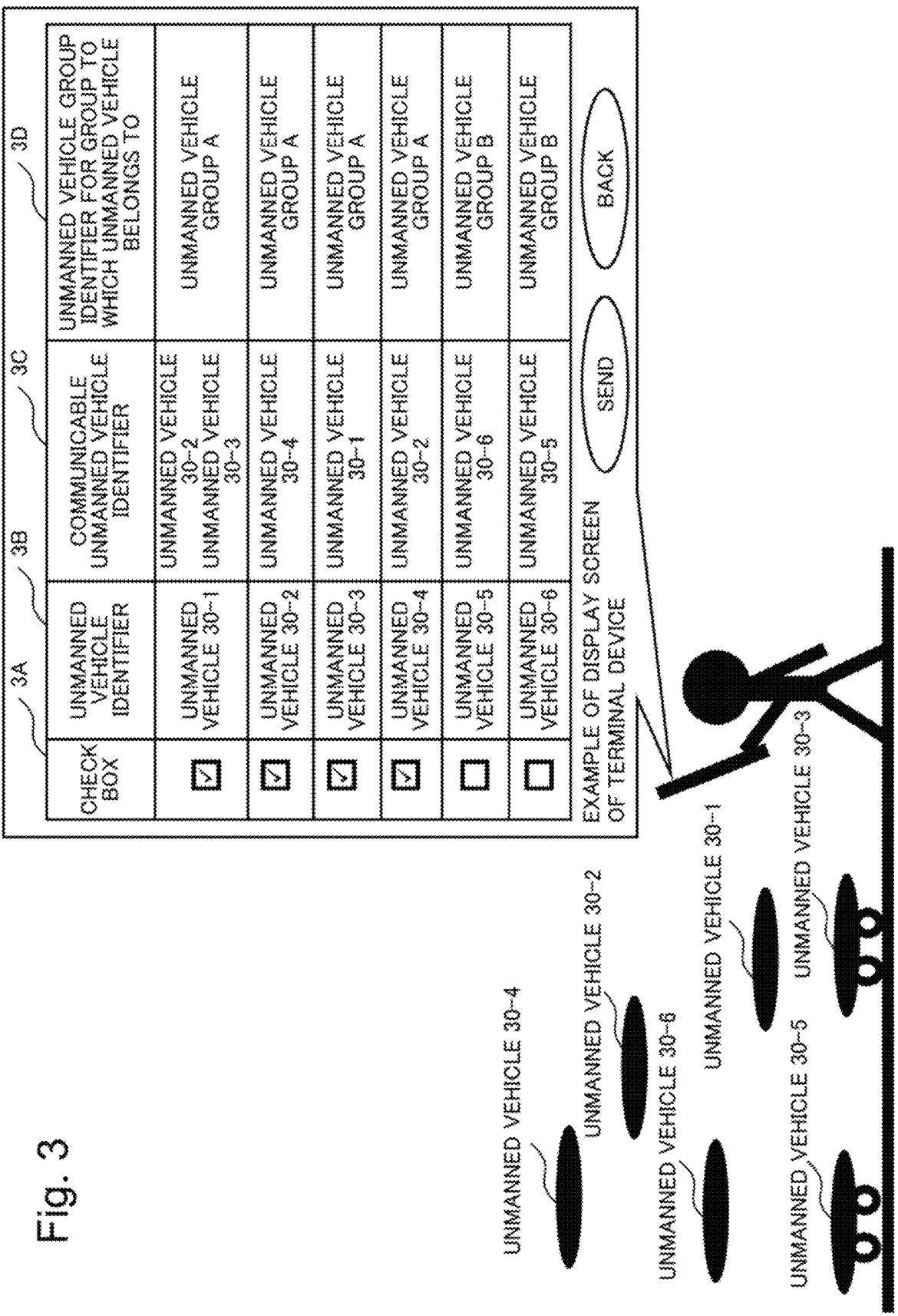

CONTROL OF HOST VEHICLE OF UNMANNED VEHICLE GROUP BASED ON CONSTRAINT CONDITION, ACTIVITY SITUATION OF HOST VEHICLE, AND ACTIVITY AMOUNT OF HOST VEHICLE

This application is a National Stage Entry of PCT/JP2019/044623 filed on Nov. 14, 2019, the contents of all of which are incorporated herein by reference, in their entirety.

TECHNICAL FIELD

The present invention relates to an unmanned vehicle control device that controls a plurality of unmanned vehicles, an unmanned vehicle control system, an unmanned vehicle control method, and a recording medium.

BACKGROUND ART

In recent years, there has arisen a need to use a robot such as an unmanned vehicle in various situations.

For example, PTL 1 proposes a method of changing a behavior characteristic by changing a selection probability from a motion group having different load characteristics according to a remaining battery level in order to cause a robot to perform a rational action according to remaining energy to generate empathy in a person.

PTL 2 proposes a method in which a plurality of robots receives a density function indicating the importance of a region, calculate a movement vector of the robots based on the density function and a movement vector of adjacent robots, and move to the region.

In order to avoid a collision accident in advance, PTL 3 proposes a method of controlling the speed of a host vehicle moving body according to the distance to the shade detected by obstacle detection.

PTL 4 proposes a method of controlling power consumption of a device based on a set evaluation function when an upper limit power amount for an entire power consumption system is set.

CITATION LIST

Patent Literature

[PTL 1] WO 2018/012446
[PTL 2] JP 2017-519279 T
[PTL 3] JP 2010-134656 A
[PTL 4] WO 2014/208299

SUMMARY OF INVENTION

Technical Problem

However, in the related art, since an activity of each robot is optimally controlled, there is a problem in that control cannot be performed in consideration of a situation of the entire plurality of robots.

An object of the present invention is to more efficiently control a plurality of unmanned vehicles in view of the problems described above.

Solution to Problem

According to a first point of view of the present invention, there is provided an unmanned vehicle belonging to an unmanned vehicle group including a plurality of unmanned vehicles, the unmanned vehicle including receiving means configured to receive a constraint condition related to an activity amount of the unmanned vehicle group and control means configured to control a host vehicle based on the constraint condition received by the receiving means and an activity situation of the host vehicle.

According to a second point of view of the present invention, there is provided an unmanned vehicle control system including an unmanned vehicle group including a plurality of unmanned vehicles and a terminal device capable of communicating with the plurality of unmanned vehicles, in which the terminal device receives an input of a constraint condition related to an activity amount of the unmanned vehicle group and transmits the constraint condition to the plurality of unmanned vehicles, and the unmanned vehicle receives the constraint condition, and controls a host vehicle based on the received constraint condition and an activity situation of the host vehicle.

According to a third point of view of the present invention, there is provided a control method to be executed by an unmanned vehicle belonging to an unmanned vehicle group including a plurality of unmanned vehicles, the method including receiving a constraint condition related to an activity amount of the unmanned vehicle group and controlling a host vehicle based on the received constraint condition and an activity situation of the host vehicle.

According to a fourth point of view of the present invention, there is provided a recording medium for storing a program that causes an unmanned vehicle belonging to an unmanned vehicle group including a plurality of unmanned vehicles to execute a process of receiving a constraint condition related to an activity amount of the unmanned vehicle group and a process of controlling a host vehicle based on the received constraint condition and an activity situation of the host vehicle.

Advantageous Effects of Invention

According to the present invention, a plurality of unmanned vehicles can be controlled more efficiently.

BRIEF DESCRIPTION OF DRAWINGS

FIG. 3 is a diagram for illustrating a transmission method of a constraint condition in the first example embodiment.

EXAMPLE EMBODIMENT

An unmanned vehicle is an airframe that can be operated in an unmanned state without being boarded by a human. For example, the unmanned vehicle includes an unmanned aerial vehicle (or drone), an unmanned ground vehicle, an unmanned surface ship, an unmanned submarine, and an unmanned spacecraft.

For example, there is a trend for information acquisition devices such as sensors and cameras to be mounted on an unmanned vehicle, and these devices are controlled on behalf of a person to be used for efficient and safe operation execution in a specific area. Specifically, it is conceivable to use the unmanned vehicle to safely and efficiently assess the situation in an area where the situation is unknown such as in a disaster-stricken area. Introducing a plurality of unmanned vehicles (hereinafter, also referred to as an "unmanned vehicle group") to improve task execution efficiency and provide fault resistance can be also considered. In order to facilitate the operation of a plurality of unmanned vehicles, a method of autonomously controlling a host vehicle based on a given task may be used. In many cases, the unmanned vehicle is driven by a battery or the like, and the active time and an activity amount are finite. Here, the activity amount includes power consumption, a total moving distance, a moving amount per unit time, a momentum, and the like. Therefore, there is a need to control the activity amount of the entire unmanned vehicle group in accordance with an activity situation of each unmanned vehicle while executing the task in order to suppress battery consumption and maximize the active time and the activity amount.

For example, in a case where the unmanned vehicle is caused to patrol in order to monitor a target area, when it is determined that the target area has become a safe area, there is a need to operate the unmanned vehicle while suppressing the movement of the patrol.

For example, in a case where a target object is tracked by the unmanned vehicle, if it is determined that the importance of the tracking target object is low (for example, it may be a decoy or something similar), there is a need to suppress the activity amount for tracking.

Hereinafter, example embodiments will be specifically described with reference to the drawings.

First Example Embodiment

Figure 1:
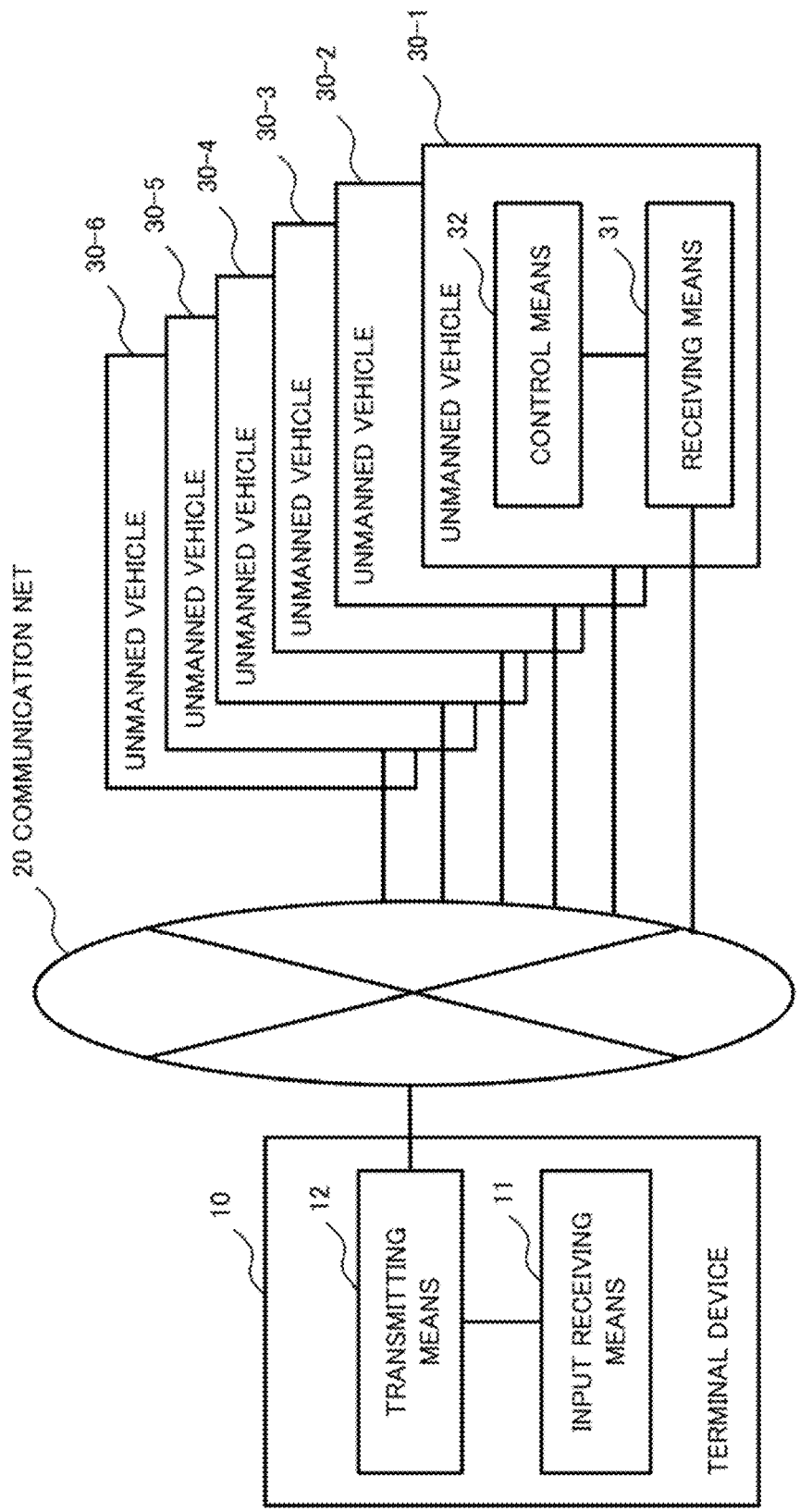
FIG. 1 is a diagram illustrating a configuration of an unmanned vehicle control system in a first example embodiment.

FIG. 1 is a diagram illustrating a configuration of an unmanned vehicle control system according to the present example embodiment. The unmanned vehicle control system in FIG. 1 includes a terminal device 10, a communication net 20, and unmanned vehicles 30-1 to 30-6. While is assumed in FIG. 1 that six unmanned vehicles are controlled, the number of unmanned vehicles is not limited thereto. In the following description of the unmanned vehicles 30-1 to 30-6, the unmanned vehicles 30-1 to 30-6 will be referred to as unmanned vehicles 30. That is, in the following description, description of the unmanned vehicle 30 corresponds to description of the unmanned vehicles 30-1 to 30-6.

The terminal device 10 illustrated in FIG. 1 includes input receiving means 11 and transmitting means 12.

The input receiving means 11 receives an input of a constraint condition for a plurality of unmanned vehicles.

The input receiving means 11 outputs the constraint condition for which the input has been received to the transmitting means 12.

The transmitting means 12 transmits the constraint condition that the input receiving means 11 has received to a plurality of unmanned vehicles via the communication net 20.

Next, the configuration of the unmanned vehicle 30 will be described with reference to FIG. 1. The unmanned vehicle 30 illustrated in FIG. 1 includes receiving means 31 and control means 32.

The receiving means 31 receives a constraint condition transmitted by the terminal device 10. The receiving means 31 outputs the received constraint condition to the control means 32.

The control means 32 controls the host vehicle based on the constraint condition received by the receiving means and an activity situation of the host vehicle.

Specifically, for example, in a case where the unmanned vehicle 30 executes a task of tracking a target object, the activity situation of the host vehicle is a distance to the target object. For example, in a case where the unmanned vehicle 30 executes a task of patrolling a predetermined area, the activity situation of the host vehicle is a flyable area (the area of the flyable area or the number of flyable areas) per unit time. For example, the activity situation of the host vehicle includes an activity amount, a traveling direction, and an activity duration (for example, a flight time, a travel time, and the like.) of the host vehicle.

The unmanned vehicle 30 may include storage means (not illustrated). In this case, the storage means may store the constraint condition received by the receiving means 31, the activity amount of the host vehicle, and the activity situation of the host vehicle.

Figure 2A:
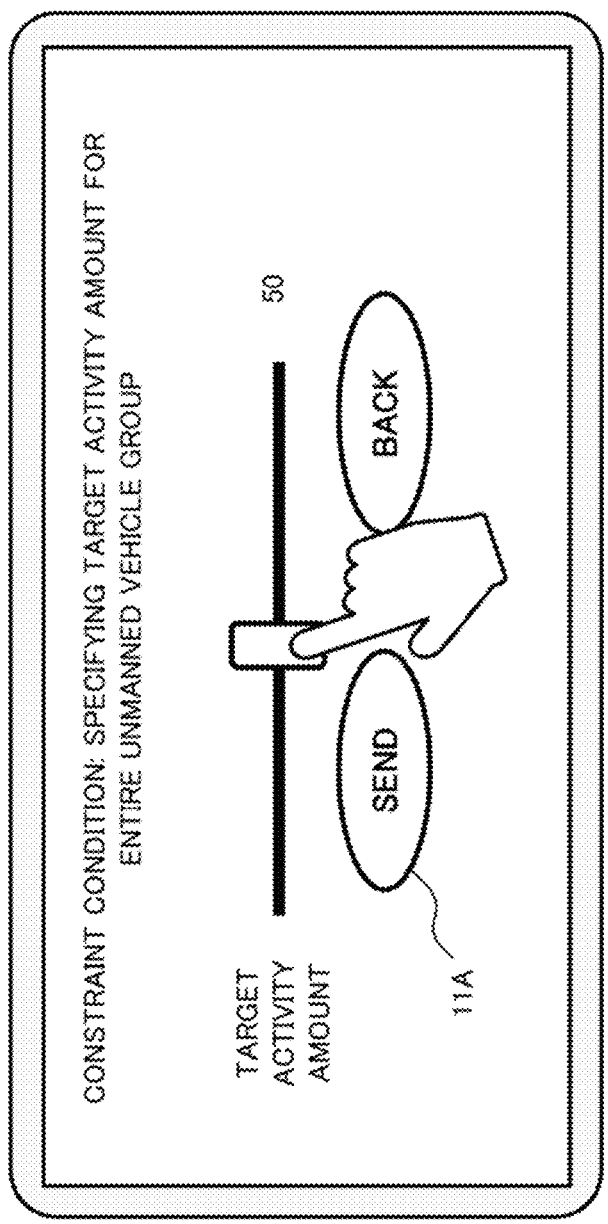
FIG. 2A is a diagram illustrating an example of a display screen of a terminal device for inputting a constraint condition in the first example embodiment.
Figure 2B:
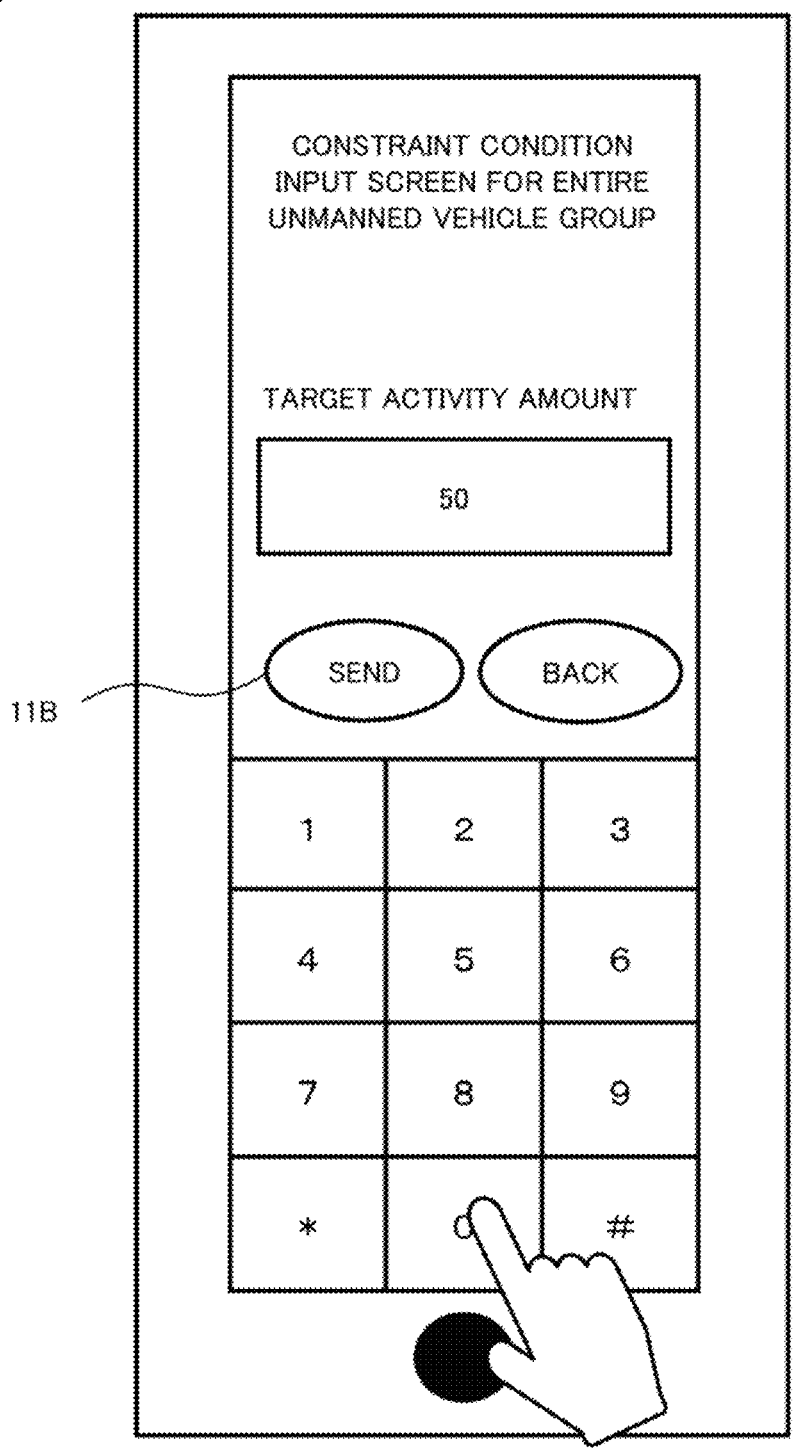
FIG. 2B is a diagram illustrating the example of the display screen of the terminal device for inputting the constraint condition in the first example embodiment.

FIGS. 2A and 2B are diagrams illustrating examples of the display screen of the terminal device for a user to input the constraint condition. For example, the input receiving means 11 receives, from the user, an input of a constraint condition input by operating a user interface (UI) displayed on a display screen of the terminal device 10 as illustrated in FIGS. 2A and 2B. For example, the constraint condition is the sum of the activity amount across the plurality of unmanned vehicles (hereinafter, it is also referred to as a "target activity amount"). In the example of FIG. 2A, the user operates a slide bar to input a target activity amount as a constraint condition. In the example of FIG. 2B, the target activity amount as the constraint condition is input by tapping a keyboard displayed on the display screen of the terminal device.

In addition to FIGS. 2A and 2B, the user can also input the constraint condition by voice, for example. In this case, the terminal device 10 receives an input of a voice signal of a voice uttered by the user and recognizes the voice to receive an input of the constraint condition. For example, in the examples of FIGS. 2A and 2B, the user taps or presses a send button 11A or 11B displayed on the display screen of the terminal, so that the constraint condition can be transmitted to the unmanned vehicle.

FIG. 3 is a diagram for illustrating a transmission method of a constraint condition. In the example of the display screen of the terminal device illustrated in FIG. 3, a check box 3A for selecting the unmanned vehicle to which the constraint condition is to be transmitted, an unmanned vehicle identifier 3B for identifying the unmanned vehicle, an identifier 3C of the unmanned vehicle with which the unmanned vehicle of the unmanned vehicle identifier can communicate, and an unmanned vehicle group identifier 3D for identifying an unmanned vehicle group to which each unmanned vehicle belongs are displayed.

For example, as illustrated in the example of the display screen of the terminal device of FIG. 3, the user can select the unmanned vehicle to which the constraint condition is to be transmitted, by tapping the "selection tab" of each unmanned vehicle displayed on the display screen of the terminal device 10. In FIG. 3, the unmanned vehicle 30-1, the unmanned vehicle 30-2, the unmanned vehicle 30-3, and the unmanned vehicle 30-4 are selected as the unmanned vehicles to be the transmission targets of the constraint conditions. Although not illustrated, the display screen of the terminal device may be configured to select the unmanned vehicle group instead of selecting the unmanned vehicle.

As a transmission method, for example, the transmitting means 12 may collectively transmit the constraint conditions to the selected unmanned vehicle, or may transfer the constraint conditions ad hoc between the selected unmanned vehicles.

Figure 4:
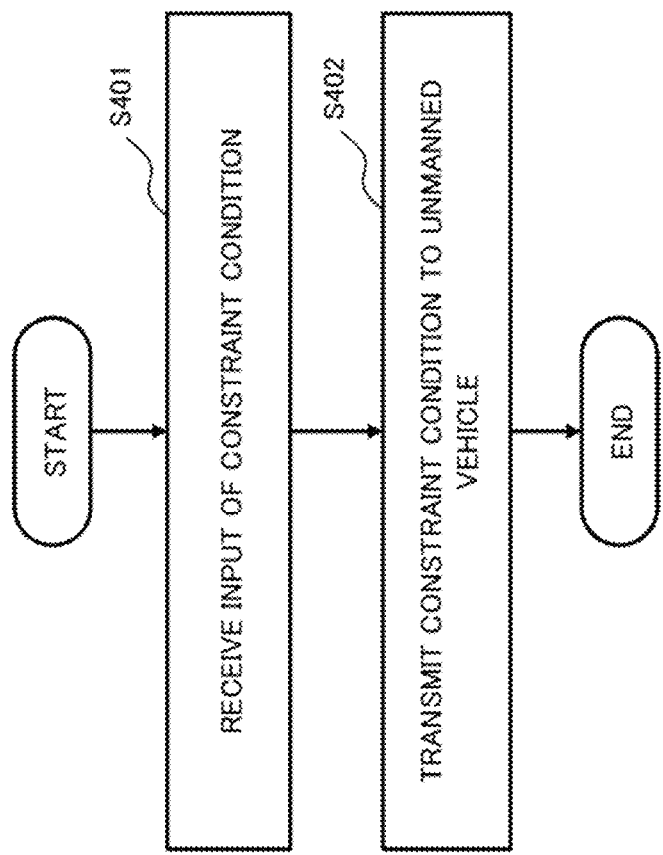
FIG. 4 is a flowchart illustrating a processing operation of the terminal device in the first example embodiment.

FIG. 4 is a flowchart illustrating a flow of processing from when the terminal device 10 receives the input of the constraint condition to when the constraint condition is transmitted to the unmanned vehicle. Hereinafter, a flow of a processing operation of the terminal device 10 will be described with reference to FIG. 4.

The input receiving means 11 receives an input of a constraint condition for a plurality of unmanned vehicles (S401). The transmitting means 12 transmits the constraint condition that the input receiving means 11 has received the input to a plurality of unmanned vehicles via the communication net 20 (s402).

Figure 5:
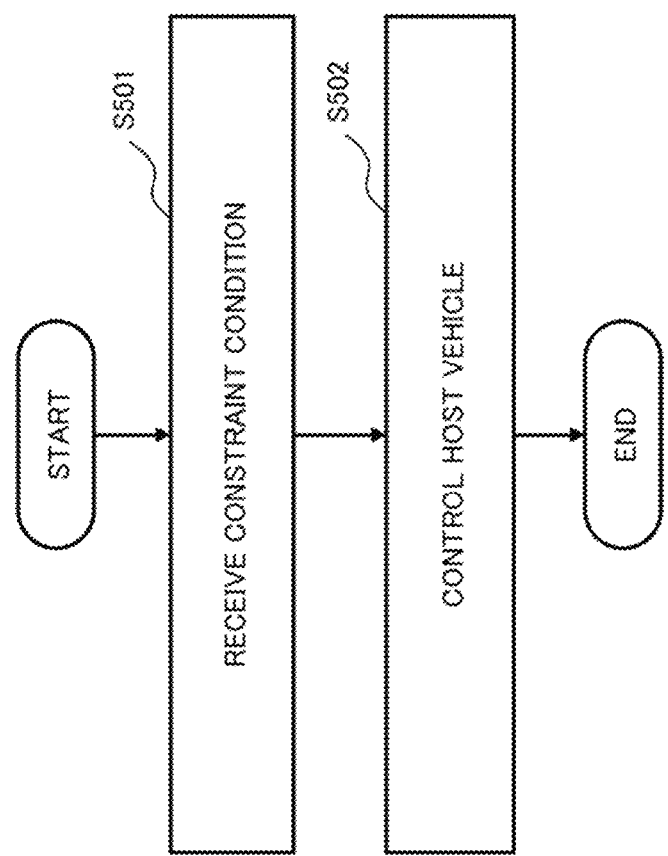
FIG. 5 is a flowchart illustrating a processing operation of an unmanned vehicle in the first example embodiment.

FIG. 5 is a flowchart illustrating a flow of processing from when the unmanned vehicle 30 receives the constraint condition to when the unmanned vehicle controls the host vehicle. Hereinafter, a flow of a processing operation of the unmanned vehicle 30 will be described with reference to FIG. 5.

The receiving means 31 receives a constraint condition transmitted by the terminal device 10 (S501). The control means 32 controls the host vehicle based on the constraint condition received by the receiving means and an activity situation of the host vehicle (S502).

The series of processes described above may be repeatedly executed every predetermined period.

As described above, the unmanned vehicle control system according to the present example embodiment controls each unmanned vehicle in accordance with the situation of the entire plurality of unmanned vehicles. This makes it possible to control the plurality of unmanned vehicles more efficiently.

Second Example Embodiment

A second example embodiment of the present invention will be described in detail with reference to the drawings.

Figure 6:
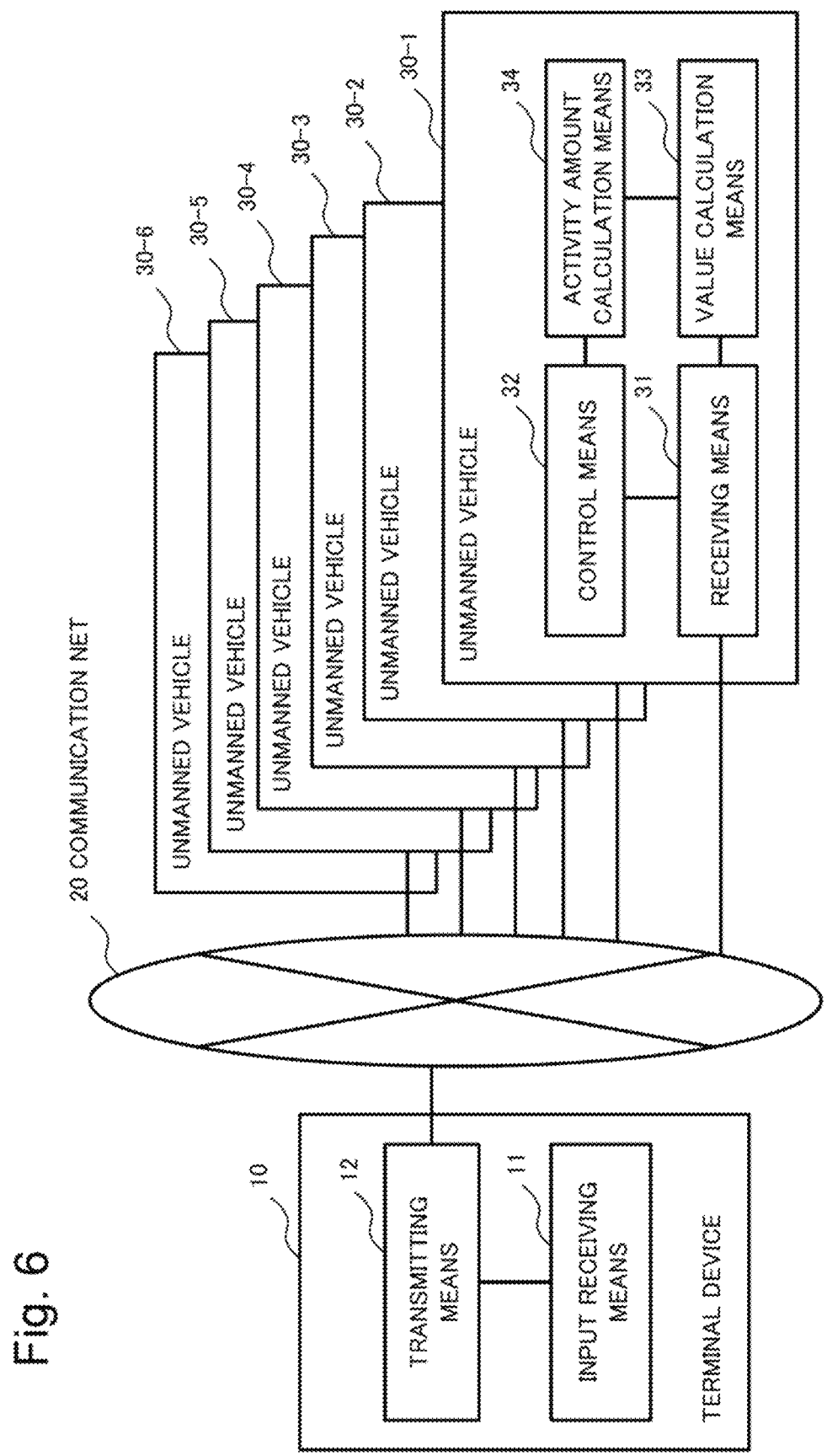
FIG. 6 is a diagram illustrating a configuration of an unmanned vehicle control system in a second example embodiment.

FIG. 6 is a diagram illustrating a configuration of an unmanned vehicle control system according to the present example embodiment.

The unmanned vehicle control system according to the present example embodiment is different from the unmanned vehicle control system in the first example embodiment in that the unmanned vehicle 30 in the present example embodiment includes value calculation means 33 and activity amount calculation means 34. Furthermore, the unmanned vehicle control system in the present example embodiment is different from the unmanned vehicle control system in the first example embodiment in the processing operation of the control means 32.

Among the configurations of the terminal device 10 and the unmanned vehicle 30, configurations that perform the same processing operations as the configurations of the terminal device 10 and the unmanned vehicle 30 of the first example embodiment are denoted by the same reference numerals as in FIG. 1, and a detailed description thereof will be omitted. In the following description of the unmanned vehicles 30-1 to 30-6, the unmanned vehicles 30-1 to 30-6 will be referred to as unmanned vehicles 30. That is, in the following description, description of the unmanned vehicle 30 corresponds to description of the unmanned vehicles 30-1 to 30-6.

The value calculation means 33 calculates a value of the activity amount of the host vehicle based on the constraint condition received by the receiving means 31 and the activity situation of the host vehicle. The value is a numerical value indicating how useful the activity amount of the host vehicle is in order for the plurality of unmanned vehicles to achieve the task. For example, the value in the case where a plurality of unmanned vehicles completes a task of tracking a target object is the distance between the target object and each unmanned vehicle. The smaller the distance to the target object, the greater the value of the activity amount of the unmanned vehicle. For example, in a case where the task of patrolling an area by a plurality of unmanned vehicles is completed, the activity amount of the unmanned vehicle having a large area and the number of areas that can be patrolled per unit time of each unmanned vehicle is more valuable.

The activity amount calculation means 34 calculates the activity amount of the host vehicle based on the value of the activity amount of the host vehicle calculated by the value calculation means 33, the constraint condition, and the activity situation of the host vehicle.

The control means 32 in the present example embodiment controls the host vehicle based on the constraint condition, the activity situation of the host vehicle, and the activity amount calculated by the activity amount calculation means 34.

The unmanned vehicle 30 may include storage means (not illustrated). In this case, the storage means may store the constraint condition received by the receiving means 31, the activity amount of the host vehicle, the activity situation of the host vehicle, and the value of the activity amount of the host vehicle.

Hereinafter, the control process of the unmanned vehicle according to the present example embodiment will be described using specific examples.

In a specific example, as an example of a method in which the unmanned vehicle of the present invention controls the host vehicle, a case of controlling two unmanned vehicles of an unmanned vehicle A and an unmanned vehicle B based on a distributed optimization method disclosed in WO 2014/208299 is considered. It is assumed that scalar quantities of speeds of the unmanned vehicle A and unmanned vehicle B are vA and vB (directions are separately determined), respectively, and the unmanned vehicle A and the unmanned vehicle B control the position of the host vehicle based on the scalar quantities of the speeds. That is, here, the scalar quantity of the speed is the control information. In addition, it is assumed that the activity amounts of the unmanned vehicle A and the unmanned vehicle B are eA and eB, respectively, and the activity amount is defined by the square of the speed. That is, it is assumed that eA=vA^2 and eB=vB^2.

First, the terminal device receives an input of a target action amount as a constraint condition. Here, it is assumed that the value of the target action amount is 50. The terminal device transmits the input constraint conditions to the unmanned vehicle A and the unmanned vehicle B via a communication net such as WiFi, for example.

Thereafter, the activity amount is calculated in each unmanned vehicle. Here, it is assumed that the activity amount of the unmanned vehicle A before the calculation is eA=40 and the activity amount of the unmanned vehicle B is eB=30. Here, the activity amount is expressed by a scalar quantity, but may be expressed by a vector quantity. In this case, since the sum of the activity amounts of the unmanned vehicle A and the unmanned vehicle B is 70, the control is executed such that the sum of the activity amounts becomes the value 50 of the target action amount in each unmanned vehicle. Here, it is assumed that the value of each unmanned vehicle is defined in the function of the activity amount, the value of the unmanned vehicle A is defined as (eA−30)^2+100, and the value of the unmanned vehicle B is defined as (eB−40)^2+100. Since this value calculation method is defined and calculated according to the activity situation, the value may not be defined by the function. Here, for example, the optimum activity amount of each vehicle based on the constraint condition is calculated by solving a nonlinear programming method or the like in a distributed manner. In this example, the activity amount of each unmanned vehicle based on the constraint condition is calculated as eA=30 and eB=20. Thereafter, each unmanned vehicle generates control information from the calculated activity amount. In this example, since the activity amount is defined by the square of the speed, which is the control information, each of the unmanned vehicle A and the unmanned vehicle B generates vA=√30 and vB=√20 as the control information. Each unmanned vehicle controls the host vehicle based on the generated control information.

Figure 7:
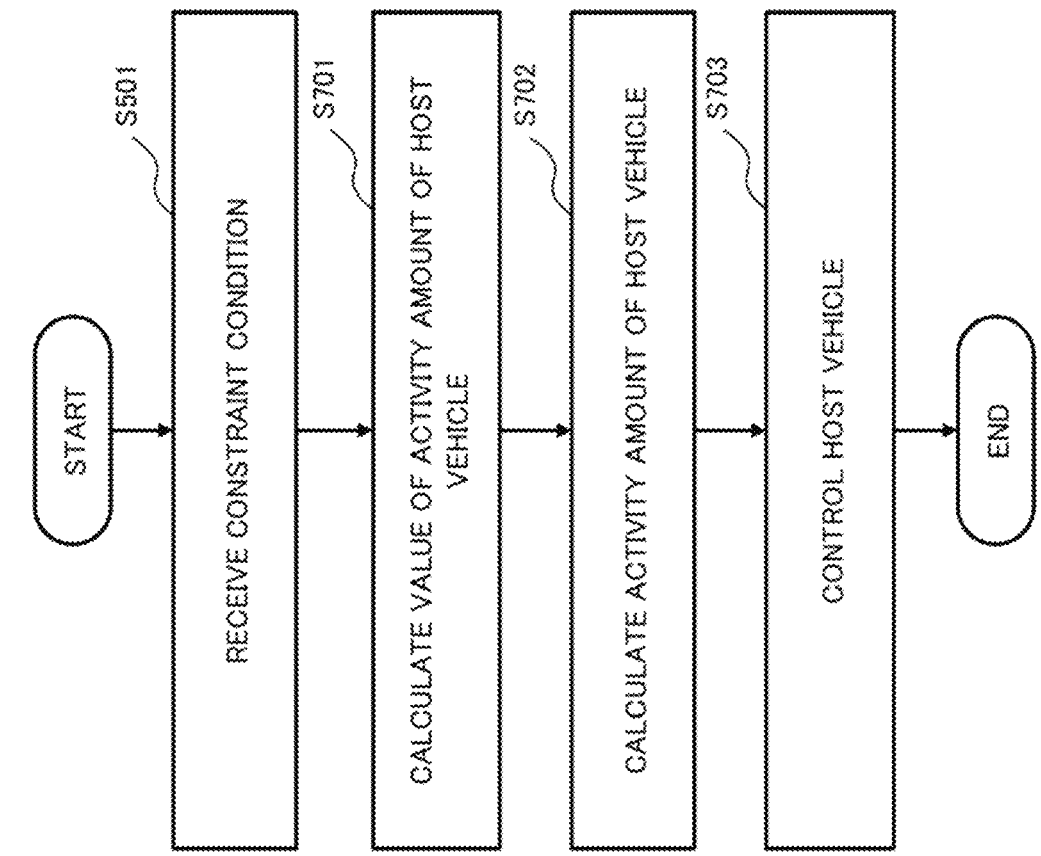
FIG. 7 is a flowchart illustrating a processing operation of an unmanned vehicle in the second example embodiment.

FIG. 7 is a flowchart illustrating a flow of processing from when the unmanned vehicle 30 receives the constraint condition to when the unmanned vehicle controls the host vehicle. Hereinafter, a flow of a processing operation of the unmanned vehicle 30 will be described with reference to FIG. 7. The same processes as those in the first example embodiment are denoted by the same reference numerals as those in FIG. 5, and description thereof will be omitted.

The value calculation means 33 calculates a value of the activity amount of the host vehicle based on the constraint condition received by the receiving means 31 and the activity situation of the host vehicle (S701). The activity amount calculation means 34 calculates the activity amount of the host vehicle based on the value of the activity amount of the host vehicle calculated by the value calculation means, the constraint condition, and the activity situation of the host vehicle (S702). The control means 32 controls the host vehicle based on the constraint condition, the activity situation of the host vehicle, and the activity amount calculated by the activity amount calculation means (S703).

The series of processes described above may be repeatedly executed every predetermined period.

As described above, the unmanned vehicle of the unmanned vehicle control system according to the present example embodiment calculates the value of the host vehicle based on the constraint condition and the activity condition of the host vehicle, and controls the host vehicle based on the activity amount calculated based on the value. This makes it possible to control the entire plurality of unmanned vehicles more efficiently.

Third Example Embodiment

A third example embodiment of the present invention will be described in detail with reference to the drawings.

Figure 8:
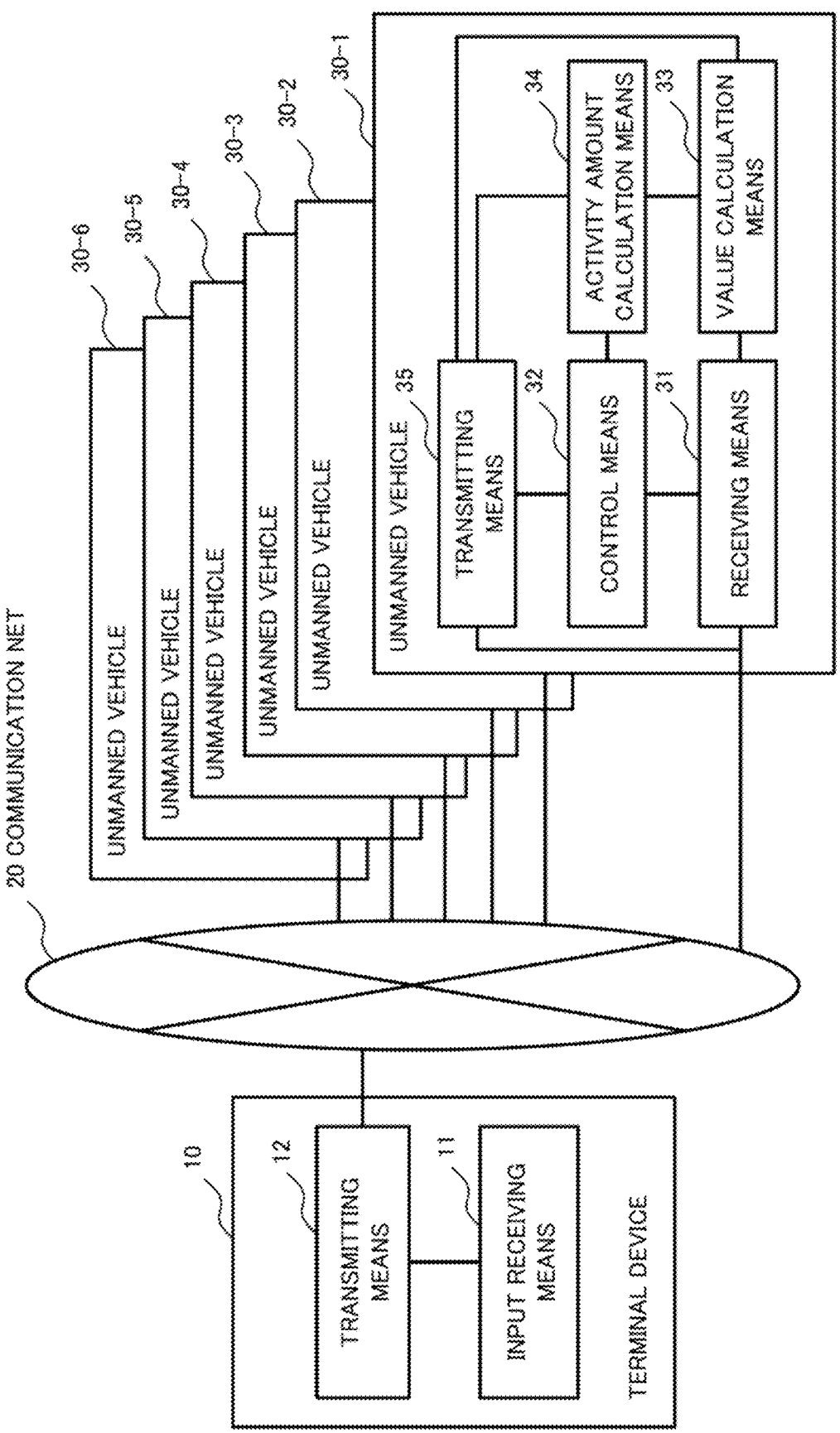
FIG. 8 is a diagram illustrating a configuration of an unmanned vehicle control system in a third example embodiment.

FIG. 8 is a diagram illustrating a configuration of an unmanned vehicle control system according to the present example embodiment.

The unmanned vehicle control system according to the present example embodiment is different from the unmanned vehicle control system according to the first and second example embodiments in the processing operation of the receiving means 31 and the value calculation means 33. Furthermore, the unmanned vehicle control system in the present example embodiment is different from the unmanned vehicle control system in the first and second example embodiments in that the unmanned vehicle includes transmitting means 35.

Among the configurations of the terminal device 10 and the unmanned vehicle 30, configurations that perform the same processing operations as the configurations of the terminal device 10 and the unmanned vehicle 30 of the first example embodiment are denoted by the same reference numerals as in FIGS. 1 and 6, and a detailed description thereof will be omitted. In the following description of the unmanned vehicles 30-1 to 30-6, the unmanned vehicles 30-1 to 30-6 will be referred to as unmanned vehicles 30. That is, in the following description, description of the unmanned vehicle 30 corresponds to description of the unmanned vehicles 30-1 to 30-6.

The unmanned vehicle 30 according to the present example embodiment includes the receiving means 31, the control means 32, the value calculation means 33, the activity amount calculation means 34, and the transmitting means 35.

The receiving means 31 receives an activity situation of another unmanned vehicle. The receiving means 31 may receive an activity amount of another unmanned vehicle.

The value calculation means 33 calculates a value of the activity amount of the host vehicle based on the constraint condition, the activity situation of the host vehicle, and the activity situation of the another unmanned vehicle received by the receiving means 31. In a case where the receiving means 31 receives the activity amount of the another unmanned vehicle, the value calculation means 33 may calculate the value of the activity amount of the host vehicle further based on the activity amount of the another unmanned vehicle.

The transmitting means 35 transmits the value of the activity amount of the host vehicle calculated by the value calculation means 33 to the another unmanned vehicle. The transmitting means 35 may transmit the activity amount calculated by the activity amount calculation means 34 to the another unmanned vehicle.

The unmanned vehicle 30 may include storage means (not illustrated). In this case, the storage means may store the constraint condition received by the receiving means 31, the activity amount of the host vehicle, and the activity situation of the host vehicle.

Figure 9:
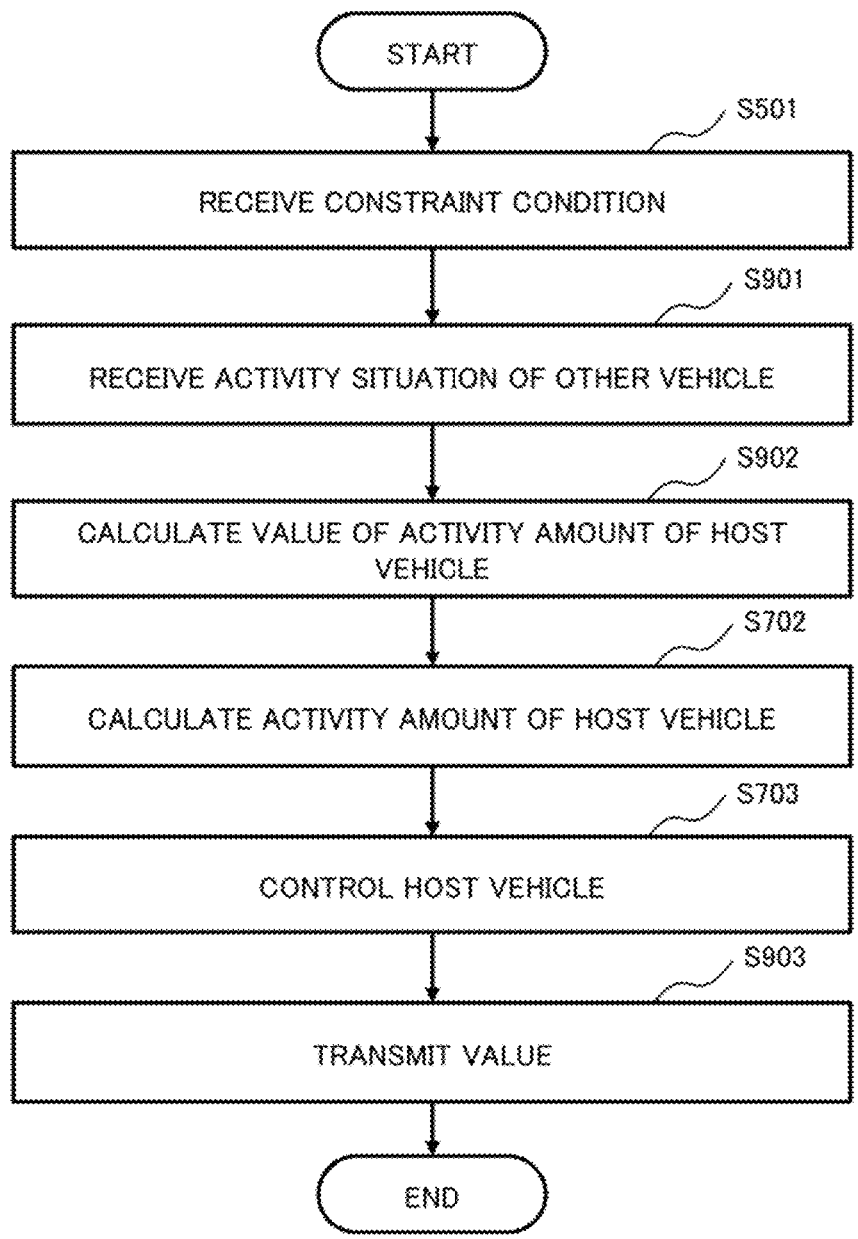
FIG. 9 is a flowchart illustrating a processing operation of an unmanned vehicle in the third example embodiment.

FIG. 9 is a flowchart illustrating a flow of processing from when the unmanned vehicle 30 receives the constraint condition to when the unmanned vehicle controls the host vehicle. Hereinafter, a flow of a processing operation of the unmanned vehicle 30 will be described with reference to FIG. 9. The same processes as those in the first and second example embodiments are denoted by the same reference numerals as those in FIGS. 5 and 7, and description thereof will be omitted.

The receiving means 31 receives an activity situation of another unmanned vehicle (S901). The value calculation means 33 calculates a value of the activity amount of the host vehicle based on the constraint condition, the activity situation of the host vehicle, and the activity situation of the another unmanned vehicle received by the receiving means 31 (S902). The transmitting means 35 transmits the value of the activity amount of the host vehicle calculated by the value calculation means 33 to the another unmanned vehicle (S903).

In the description of the flowchart in FIG. 9, it has been described that the transmitting means transmits the value of the activity amount of the host vehicle to the another unmanned vehicle, but the activity amount calculated by the activity amount calculation means 34 may be transmitted to the another unmanned vehicle. The order of the processing of the control means and the processing of the transmitting means may be sequential or may be performed simultaneously.

The series of processes described above may be repeatedly executed every predetermined period.

As described above, the unmanned vehicle of the unmanned vehicle control system according to the present example embodiment calculates the value of the host vehicle based on the activity situation or the activity amount of the another vehicle. This makes it possible to control the entire plurality of unmanned vehicles more efficiently.

Fourth Example Embodiment

A fourth example embodiment of the present invention will be described in detail with reference to the drawings.

The unmanned vehicle control system in the present example embodiment is different from the unmanned vehicle control system in the first to third example embodiments in that the unmanned vehicle 30 in the present example embodiment includes generation means 36.

Figure 10:
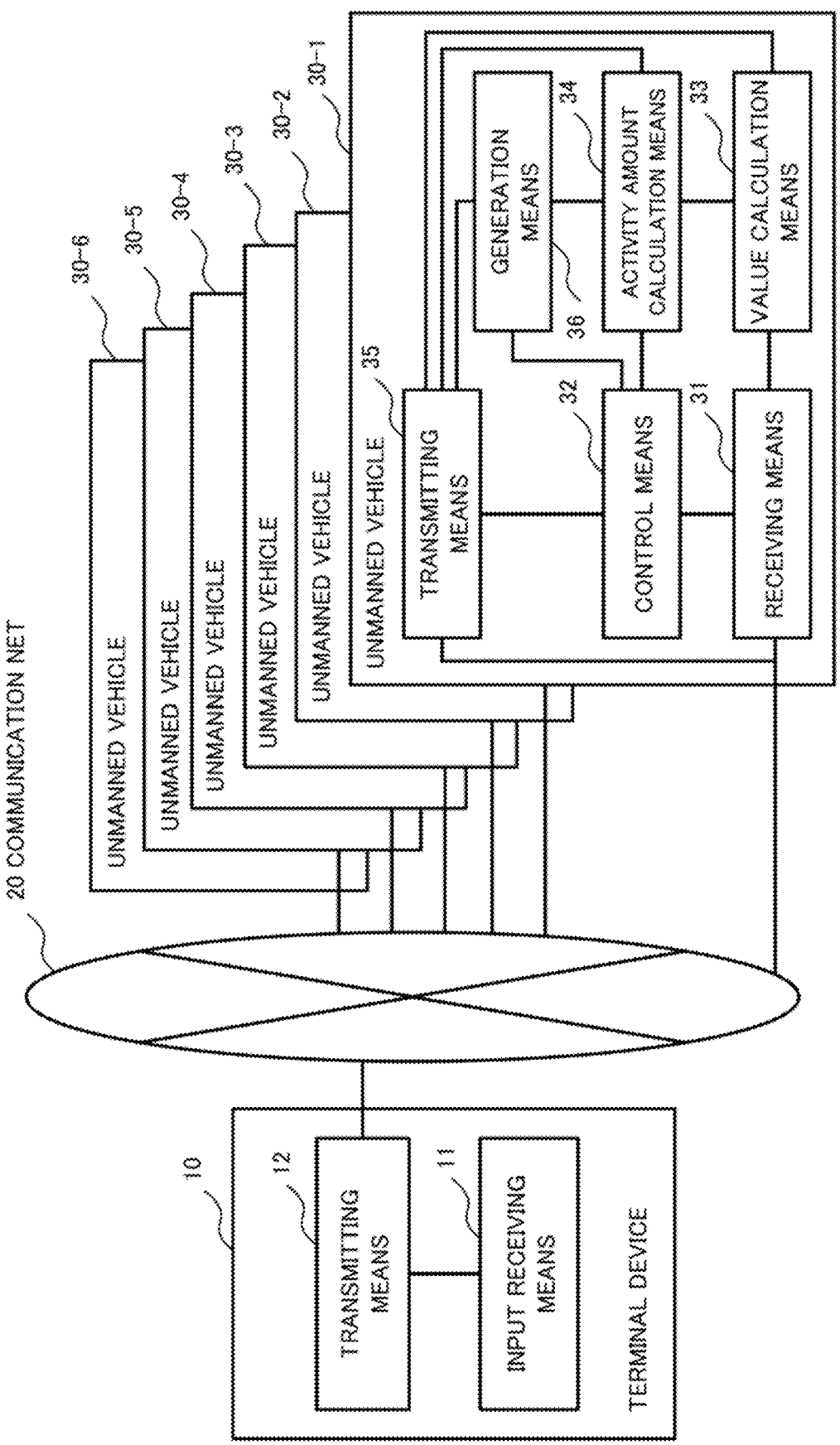
FIG. 10 is a diagram illustrating a configuration of an unmanned vehicle control system in a fourth example embodiment.

FIG. 10 is a diagram illustrating a configuration of an unmanned vehicle control system according to the present example embodiment.

Among the configurations of the terminal device 10 and the unmanned vehicle 30, configurations that perform the same processing operations as the configurations of the terminal device 10 and the unmanned vehicle 30 of the first example embodiment are denoted by the same reference numerals as in FIGS. 1, 6, and 8, and a detailed description thereof will be omitted. In the following description of the unmanned vehicles 30-1 to 30-6, the unmanned vehicles 30-1 to 30-6 will be referred to as unmanned vehicles 30. That is, in the following description, description of the unmanned vehicle 30 corresponds to description of the unmanned vehicles 30-1 to 30-6.

The generation means 36 generates control information for controlling the host vehicle based on the activity amount calculated by the activity amount calculation means 34. For example, the control information is a speed or acceleration, an angular velocity or a rotation speed of a propeller or a wheel, or the like for controlling an actuator to change the position of the host vehicle.

The control means 32 controls the host vehicle based on the control information generated by the generation means 36.

The generation means 36 may generate intermediate information based on the activity amount calculated by the activity amount calculation means 34. The intermediate information is information generated in a process in which the generation means 36 generates the control information. For example, the intermediate information is a slope of a value evaluation function or a coefficient of a value evaluation function formula. In this case, the transmitting means 35 may transmit the intermediate information generated by the generation means 36 to the another unmanned vehicle.

Although it has been described that the receiving means 31 receives the activity situation and the activity amount of the another unmanned vehicle, the receiving means may receive the control information.

Figure 11:
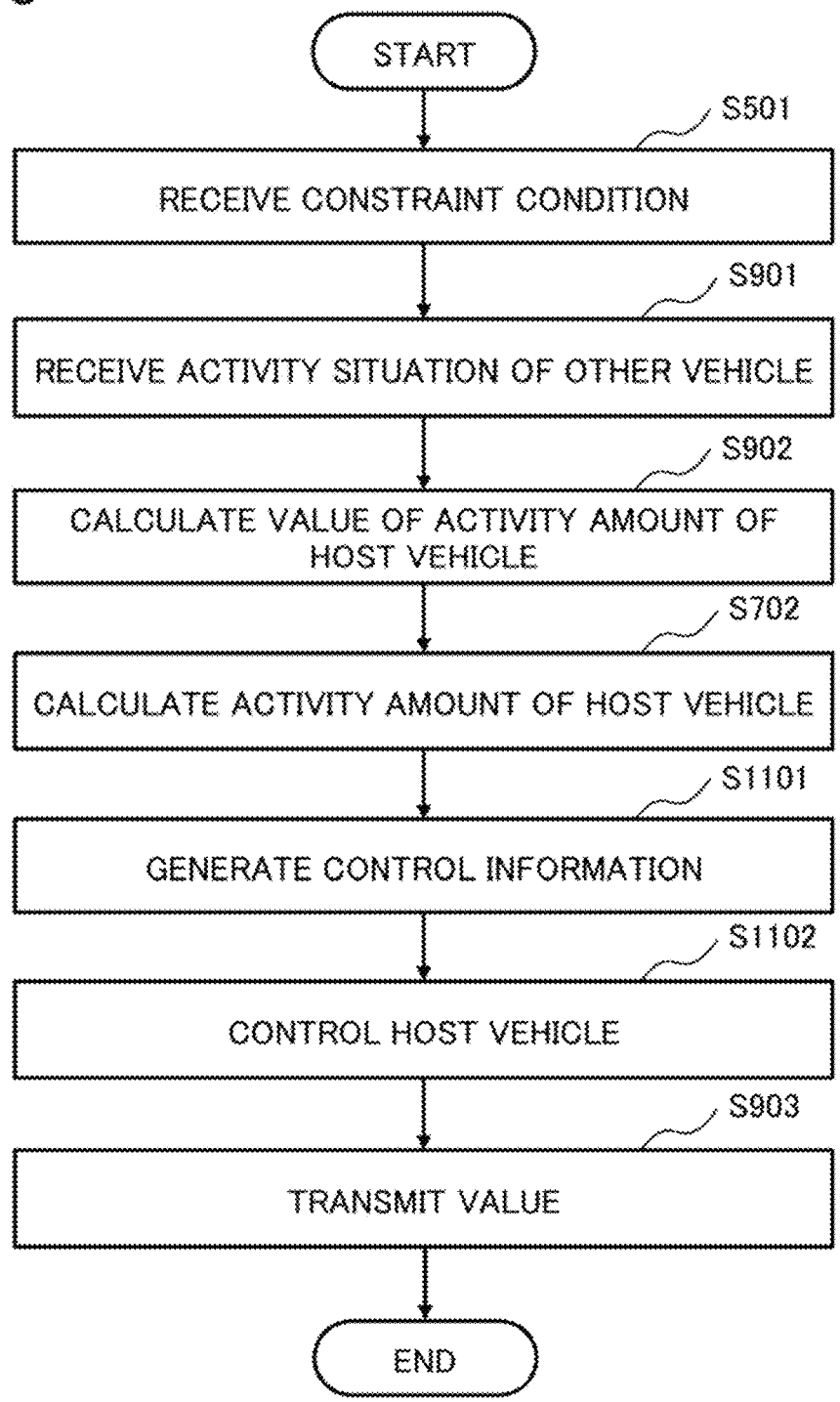
FIG. 11 is a flowchart illustrating a processing operation of an unmanned vehicle in the fourth example embodiment.

FIG. 11 is a flowchart illustrating a flow of processing from when the unmanned vehicle 30 receives the constraint condition to when the unmanned vehicle controls the host vehicle. Hereinafter, a flow of a processing operation of the unmanned vehicle 30 will be described with reference to FIG. 11. The same processes as those in the first to third example embodiments are denoted by the same reference numerals as those in FIGS. 4, 7, and 9, and description thereof will be omitted.

The generation means 36 generates control information for controlling the host vehicle based on the activity amount calculated by the activity amount calculation means 34 (S1101). The control means 32 controls the host vehicle based on the control information generated by the generation means 36 (S1102).

The series of processes described above may be repeatedly executed every predetermined period.

Fifth Example Embodiment

A fifth example embodiment of the present invention will be described in detail with reference to the drawings.

In the unmanned vehicle control system according to the first to fourth example embodiments, the unmanned vehicle performs various calculations, but in the unmanned vehicle control system according to the present example embodiment, an unmanned vehicle control device 100 performs various calculations.

Figure 12:
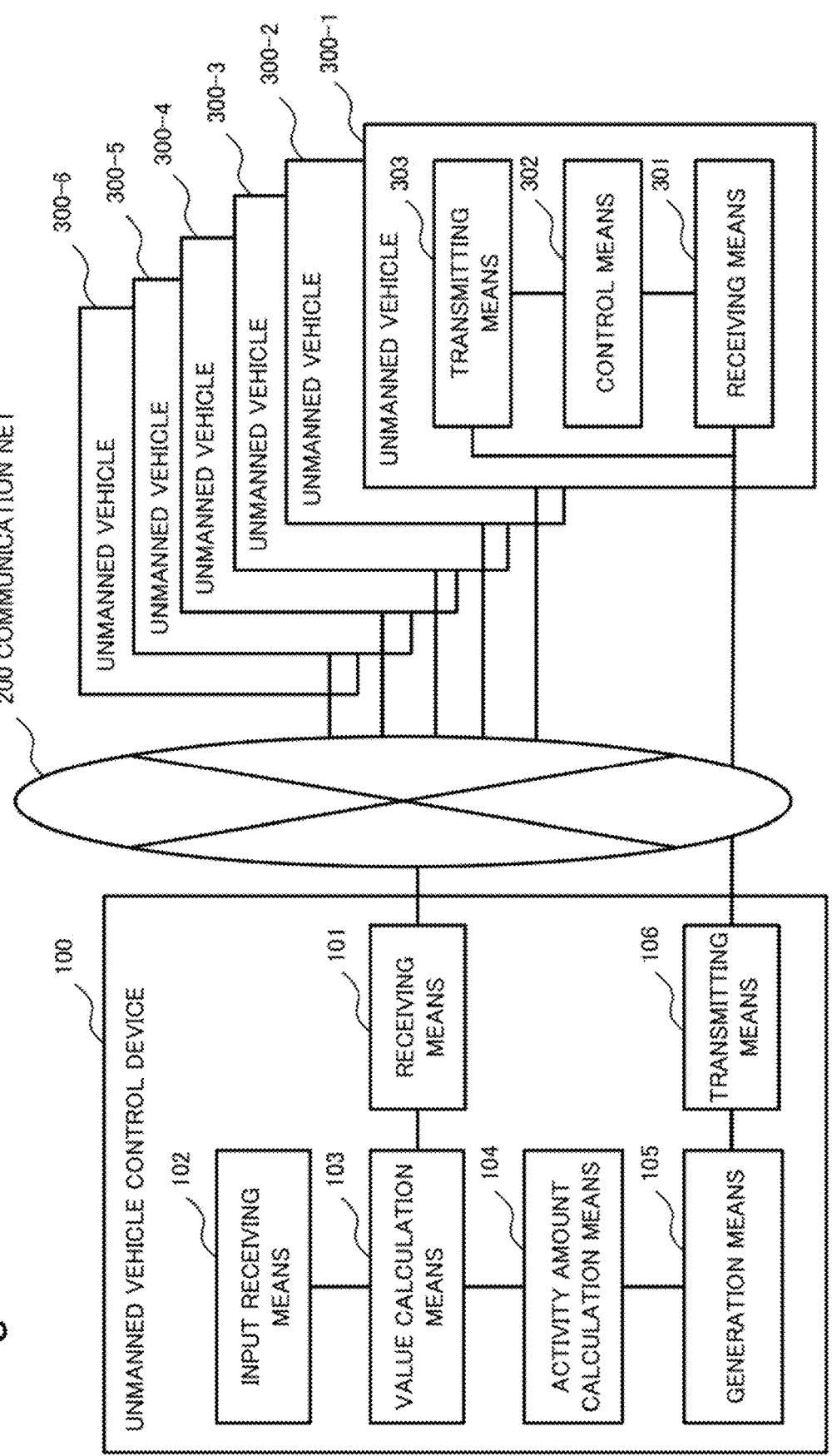
FIG. 12 is a diagram illustrating a configuration of an unmanned vehicle control system in a fifth example embodiment.

FIG. 12 is a diagram illustrating a configuration of an unmanned vehicle control system according to the present example embodiment.

The unmanned vehicle control system according to the present example embodiment includes the unmanned vehicle control device 100, a communication net 200, and unmanned vehicles 300-1 to 300-6.

It is assumed in FIG. 12 that six unmanned vehicles are controlled, the number of unmanned vehicles is not limited thereto. In the following description of the unmanned vehicles 300-1 to 300-6, the unmanned vehicles 300-1 to 300-6 will be referred to as unmanned vehicles 300. That is, in the following description, the description of the unmanned vehicle 300 refers to the description of the unmanned vehicles 300-1 to 300-6.

The unmanned vehicle control device 100 illustrated in FIG. 12 includes receiving means 101, input receiving means 102, value calculation means 103, activity amount calculation means 104, generation means 105, and transmitting means 106.

The receiving means 101 receives an activity situation of the unmanned vehicle 300 from the unmanned vehicle 300. The receiving means 101 may receive the activity amount of the unmanned vehicle 300.

The input receiving means 102 receives an input of a constraint condition for a plurality of unmanned vehicles 300.

The value calculation means 103 calculates the value of the activity amount of the unmanned vehicle 300 based on the activity situation received by the receiving means 101 and the constraint condition input by the input receiving means 102.

The activity amount calculation means 104 calculates the activity amount of the unmanned vehicle 300 based on the value of the activity amount of the unmanned vehicle 300 calculated by the value calculation means 103, the constraint condition, and the activity situation of the unmanned vehicle 300.

The generation means 105 generates control information for controlling the unmanned vehicle 300 based on the constraint condition, the activity situation of the unmanned vehicle 300, and the activity amount of the unmanned vehicle 300 calculated by the activity amount calculation means 104.

The transmitting means 106 transmits the control information generated by the generation means 105 to the unmanned vehicle 300.

The unmanned vehicle control device 100 may include storage means (not illustrated). In this case, the storage means stores the activity situation received by the receiving means 101, the constraint condition for which the input is received by the input receiving means 102, the activity amount of the unmanned vehicle 300 calculated by the activity amount calculation means 104, and the control information generated by the generation means 105.

The unmanned vehicle 300 illustrated in FIG. 12 includes receiving means 301, control means 302, and transmitting means 303.

The receiving means 301 receives control information for controlling a host vehicle from the unmanned vehicle control device 100.

The control means 302 controls the host vehicle based on the control information received by the receiving means 301.

The transmitting means 303 transmits the activity situation of the host vehicle to the unmanned vehicle control device 100.

Hereinafter, the processing operation of the unmanned vehicle control device will be described with reference to a flowchart.

Figure 13:
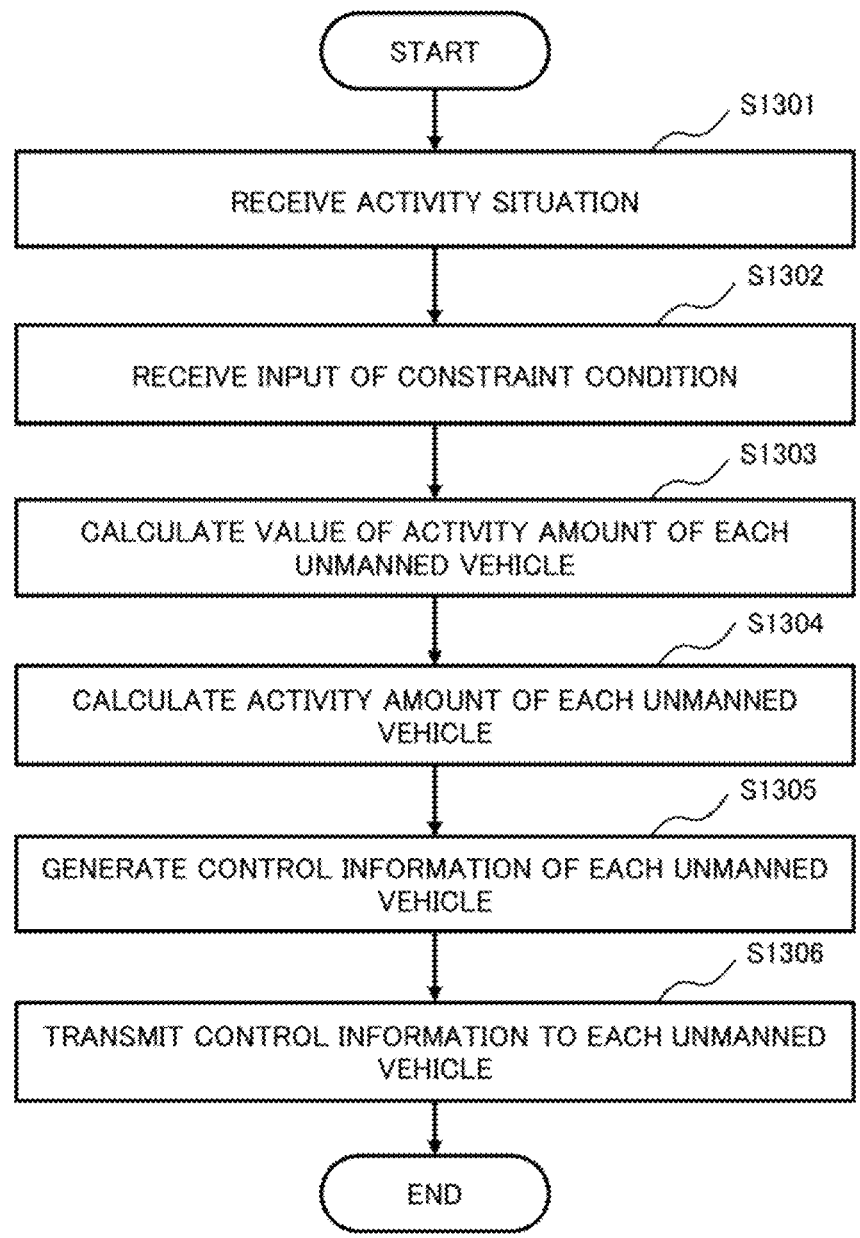
FIG. 13 is a flowchart illustrating a processing operation of an unmanned vehicle control device in the fifth example embodiment.

FIG. 13 is a flowchart illustrating a flow of processing from when the unmanned vehicle control device 100 transmits the control information to the unmanned vehicle 300. Hereinafter, a flow of a processing operation of the unmanned vehicle control device 100 will be described with reference to FIG. 13.

The receiving means 101 receives an activity situation of the unmanned vehicle 300 (S1301). The input receiving means 102 receives an input of a constraint condition for a plurality of unmanned vehicles 300 (S1302). The value calculation means 103 calculates a value of the activity amount of the unmanned vehicle 300 based on the activity situation and the constraint condition (S1303). The activity amount calculation means 104 calculates the activity amount of the unmanned vehicle 300 based on the value of the activity amount of the unmanned vehicle 300, the constraint condition, and the activity situation of the unmanned vehicle 300 (S1304). The generation means 105 generates control information for controlling the unmanned vehicle 300 based on the constraint condition, the activity situation of the unmanned vehicle 300, and the activity amount of the unmanned vehicle 300 (S1305). The transmitting means 106 transmits the control information to the unmanned vehicle 300 (S1306).

The series of processes described above may be repeatedly executed every predetermined period.

As described above, the unmanned vehicle control device of the unmanned vehicle control system according to the present example embodiment generates control information of each unmanned vehicle according to the activity situation of the plurality of unmanned vehicles. This makes it possible to control the entire plurality of unmanned vehicles more efficiently. Since the unmanned vehicle control device performs various calculations, power consumption in the unmanned vehicle can be suppressed.

Sixth Example Embodiment

A sixth example embodiment of the present invention will be described in detail with reference to the drawings.

A difference between the unmanned vehicle control system in the present example embodiment and the unmanned vehicle control system in the fourth example embodiment will be described. The unmanned vehicle control system in the present example embodiment is different from the unmanned vehicle control system in the fourth example embodiment in that at least one or more processing operations among the processing operations of the value calculation means 33, the activity amount calculation means 34, and the generation means 36 in the configuration of the unmanned vehicle 30 in the fourth example embodiment are executed by cloud computing.

Figure 14:
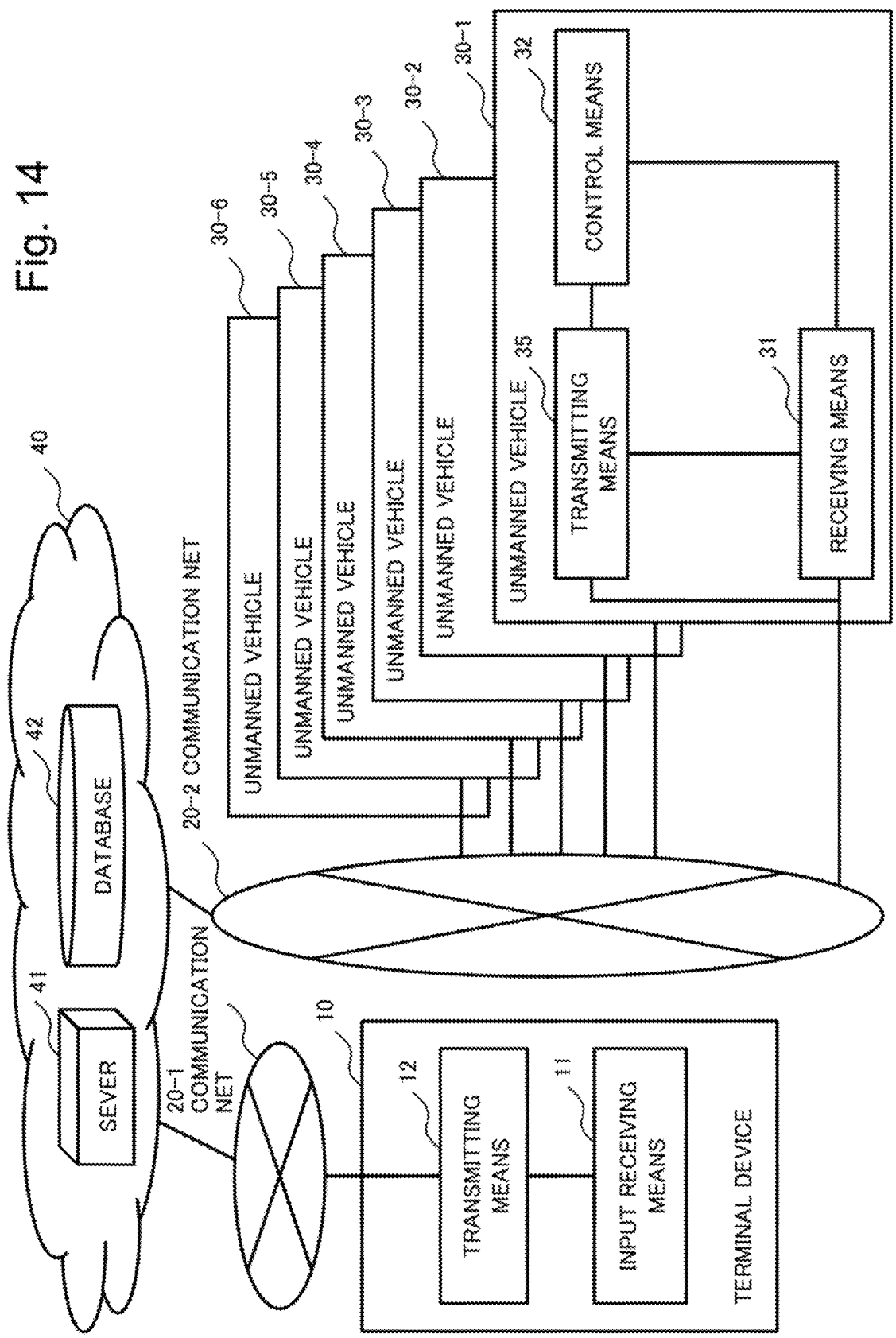
FIG. 14 is a diagram illustrating an example of a configuration of an unmanned vehicle control system in a sixth example embodiment.

FIG. 14 is an example of a configuration of an unmanned vehicle control system in the present example embodiment. The unmanned vehicle control system in FIG. 14 includes the terminal device 10, communication nets 20-1 and 20-2, and the unmanned vehicles 30-1 to 30-6. FIG. 14 is a diagram illustrating a configuration of the unmanned vehicle control system in a case where the processing operations of the value calculation means 33, the activity amount calculation means 34, and the generation means 36 are executed on the cloud in the configuration of the unmanned vehicle 30 in the fourth example embodiment.

Among the configurations of the terminal device 10 and the unmanned vehicle 30, configurations that perform the same processing operations as the configurations of the terminal device 10 and the unmanned vehicle 30 of the fourth example embodiment are denoted by the same reference numerals as in FIG. 10, and a detailed description thereof will be omitted. In the following description of the unmanned vehicles 30-1 to 30-6, the unmanned vehicles 30-1 to 30-6 will be referred to as unmanned vehicles 30. That is, in the following description, description of the unmanned vehicle 30 corresponds to description of the unmanned vehicles 30-1 to 30-6.

A server 41 receives the constraint conditions for the plurality of unmanned vehicles 30 from the terminal device 10.

The server 41 receives an activity situation of the unmanned vehicle 30 from the unmanned vehicle 30. The server 41 may receive an activity amount of the unmanned vehicle 30 from the unmanned vehicle 30.

The server 41 calculates a value of the activity amount of the unmanned vehicle 30 based on the received activity situation and the constraint condition.

The server 41 calculates the activity amount of the unmanned vehicle 30 based on the calculated value of the activity amount, the constraint condition, and the activity situation of the unmanned vehicle 30.

The server 41 generates control information for controlling the unmanned vehicle 30 based on the constraint condition, the activity situation, and the calculated activity amount.

The server 41 transmits the generated control information to the unmanned vehicle 30.

A database 42 may store the received activity situation, activity amount, and constraint condition. The database 42 may store the calculated value and activity amount. The database 42 may store the generated control information.

The series of processes described above may be repeatedly executed every predetermined period.

As described above, in the unmanned vehicle control system according to the present example embodiment, some of the processing operations executed by the terminal device, the unmanned vehicle control device, and the unmanned vehicle are executed by cloud computing. By distributing the functions of the devices in this manner, the processing load of each vehicle can be reduced.

<Hardware Configuration Implementing Each Part of Example Embodiment>

In each example embodiment of the present invention described above, a block representing each component of each device is illustrated in a functional unit. However, the block representing the component does not necessarily mean that each component is formed of a separate module.

Processing of each component may also be implemented, for example, by a computer system reading and executing a program that causes the computer system to execute the processing stored in a computer-readable recording medium. The "computer-readable recording medium" is, for example, a portable medium such as an optical disk, a magnetic disk, a magneto-optical disc, and a nonvolatile semiconductor memory, and a recording device such as a read only memory (ROM) and a hard disk incorporated in a computer system. The "computer-readable recording medium" includes a medium that may temporarily hold a program such as a volatile memory in the computer system, and a medium that transmits the program, such as a communication line such as a network or a telephone line. The program may be for achieving a part of the above-described functions, and further may achieve the above-described functions described by combination with the program already recorded in the computer system.

Figure 15:
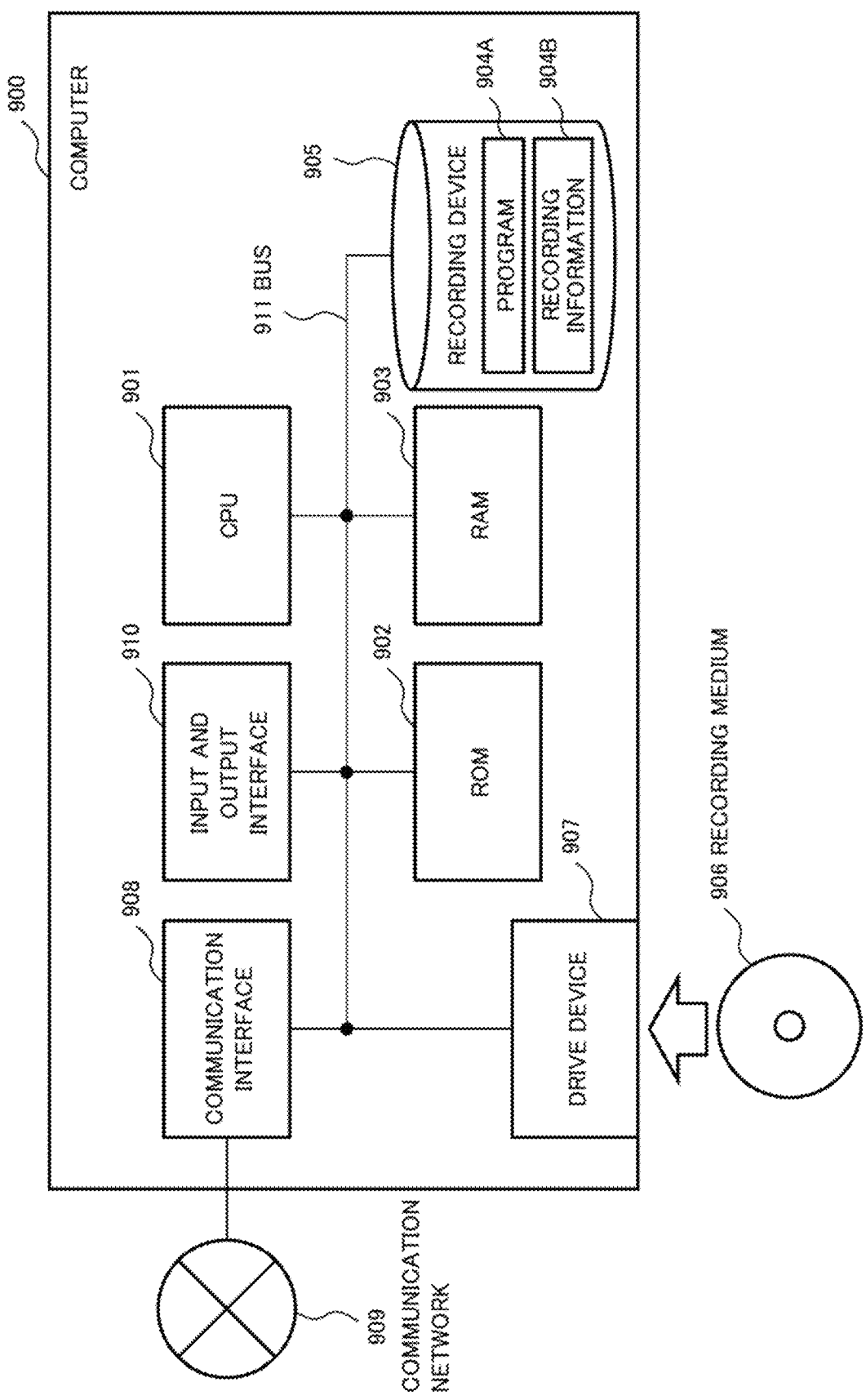
FIG. 15 is a block diagram illustrating an example of hardware constituting each unit of each example embodiment of the present invention.

The "computer system" is, by way of example, a system including a computer 900 as illustrated in FIG. 15. The computer 900 includes the following configuration.

One or a plurality of central processing units (CPUs) 901
ROM 902
Random access memory (RAM) 903
Program 904A and recording information 904B loaded into RAM 903
Recording device 905 that stores program 904A and recording information 904B
Drive device 907 that reads from and writes in recording medium 906
Communication interface 908 that connects to communication network 909
Input and output interface 910 that inputs and outputs data
Bus 911 that connects each component For example, each component of each device in each example embodiment is implemented by the CPU 901 loading a program 904A that implements a function of the component into the RAM 903 and executing the program. The program 904A that implements the function of each component of each device is stored in advance, for example, in the recording device 905 or the ROM 902. The CPU 901 then reads the program 904A as necessary. The recording device 905 is, for example, a hard disk. The program 904 A may be supplied via the communication network 909 to the CPU 901, or may be stored in advance in the recording medium 906, read by the drive device 907, and supplied to the CPU 901. The recording medium 906 is, for example, a portable medium such as an optical disk, a magnetic disk, a magneto-optical disk, and a nonvolatile semiconductor memory.

There are various modifications of a method of implementing each device. For example, each device may be implemented by a possible combination of a separate computer 900 and a program for each component. A plurality of components of each device may be implemented by a possible combination of one computer 900 and a program.

Some or all of the components of each device may be implemented by other general purpose or dedicated circuit, computers, and the like, or a combination of them. They may be configured of a single chip or a plurality of chips connected via a bus.

As described above, in a case where some or all of the components of each device are implemented by a plurality of computers, circuits, and the like, a plurality of computers, circuits, and the like may be collectedly arranged or arranged in a distributed manner. For example, the computer, the circuit, and the like may be implemented as a mode in which each of a client and server system, a cloud computing system, and the like is connected via a communication network.

(Supplementary Notes)

The configurations of the above-described example embodiments may be combined or some components may be replaced. The configuration of the present invention is not limited to the above-described example embodiment, and various modifications may be made without departing from the gist of the present invention.

Some of all of the above-described example embodiments may be described as in the following supplementary notes, but are not limited to the following.

(Supplementary Note 1)

An unmanned vehicle belonging to an unmanned vehicle group including a plurality of unmanned vehicles, the unmanned vehicle including:
  receiving means configured to receive a constraint condition related to an activity amount of the unmanned vehicle group; and
  control means configured to control a host vehicle based on the constraint condition received by the receiving means and an activity situation of the host vehicle.

(Supplementary Note 2)

The unmanned vehicle according to Supplementary Note 1, further including:
  value calculation means configured to calculate a value of the activity amount of the host vehicle in the unmanned vehicle group based on the constraint condition and the activity situation of the host vehicle; and
  activity amount calculation means configured to calculate the activity amount of the host vehicle based on the value calculated by the value calculation means, the constraint condition, and the activity situation of the host vehicle,
in which the control means controls the host vehicle further based on the activity amount calculated by the activity amount calculation means.

(Supplementary Note 3)

The unmanned vehicle according to Supplementary Note 2,
in which the receiving means further receives an activity situation of another unmanned vehicle from the another unmanned vehicle, and
the value calculation means calculates a value of the activity amount of the host vehicle further based on the activity situation of the another unmanned vehicle received by the receiving means.

(Supplementary Note 4)

The unmanned vehicle according to Supplementary Note 2 or 3,
in which the receiving means further receives an activity amount of another unmanned vehicle from the another unmanned vehicle, and
the value calculation means calculates a value of the activity amount of the host vehicle further based on the activity amount of the another unmanned vehicle received by the receiving means.

(Supplementary Note 5)

The unmanned vehicle according to Supplementary Note 3 or 4, further including:
generation means configured to generate control information for controlling the host vehicle based on the activity amount; and
transmitting means configured to transmit the control information generated by the generation means to the another unmanned vehicle.

(Supplementary Note 6)

The unmanned vehicle according to any one of Supplementary Notes 3 to 5,
in which the receiving means performs reception every predetermined period,
the value calculation means calculates a value of the activity amount of the host vehicle every predetermined period, and
the activity amount calculation means calculates the activity amount of the host vehicle every predetermined period.

(Supplementary Note 7)

An unmanned vehicle control system including:
an unmanned vehicle group including a plurality of unmanned vehicles; and
a terminal device capable of communicating with the plurality of unmanned vehicles,
in which the terminal device
receives an input of a constraint condition related to an activity amount of the unmanned vehicle group and transmits the constraint condition to the plurality of unmanned vehicles, and
the unmanned vehicle
receives the constraint condition, and
controls a host vehicle based on the received constraint condition and an activity situation of the host vehicle.

(Supplementary Note 8)

A control method to be executed by an unmanned vehicle belonging to an unmanned vehicle group including a plurality of unmanned vehicles, the method including:
receiving a constraint condition related to an activity amount of the unmanned vehicle group; and
controlling a host vehicle based on the received constraint condition and an activity situation of the host vehicle.

(Supplementary Note 9)

A recording medium for storing a program that causes an unmanned vehicle belonging to an unmanned vehicle group including a plurality of unmanned vehicles to execute:
a process of receiving a constraint condition related to an activity amount of the unmanned vehicle group; and
a process of controlling a host vehicle based on the received constraint condition and an activity situation of the host vehicle.

(Supplementary Note 10)

A control device capable of communicating with an unmanned vehicle belonging to an unmanned vehicle group including a plurality of unmanned vehicles, the control device including:
receiving means configured to receive an activity situation of the unmanned vehicle;
input receiving means configured to receive an input of a constraint condition related to an activity amount of the unmanned vehicle group;
value calculation means configured to calculate a value of the activity amount of the unmanned vehicle in the unmanned vehicle group based on the constraint condition received by the input receiving means and the activity situation of the unmanned vehicle received by the receiving means;
activity amount calculation means configured to calculate the activity amount of the unmanned vehicle based on the value calculated by the value calculation means, the constraint condition, and the activity situation of the unmanned vehicle; and
transmitting means configured to transmit the activity amount calculated by the activity amount calculation means to the unmanned vehicle.

(Supplementary Note 11)

The control device according to Supplementary Note 10,
in which the receiving means further receives an activity situation of another unmanned vehicle from the another unmanned vehicle, and
the value calculation means calculates a value of the activity amount of the unmanned vehicle further based on the activity situation of the another unmanned vehicle received by the receiving means.

(Supplementary Note 12)

The control device according to Supplementary Note 10 or 11,
in which the receiving means further receives an activity amount of another unmanned vehicle from the another unmanned vehicle, and
the value calculation means calculates a value of the activity amount of the unmanned vehicle further based on the activity amount of the another unmanned vehicle received by the receiving means.

(Supplementary Note 13)

The control device according to any one of Supplementary Notes 10 to 12, further including:
generation means configured to generate control information for controlling the unmanned vehicle based on the activity amount calculated by the activity amount calculation means;
in which the transmitting means transmits control means generated by the generation means to the unmanned vehicle.

(Supplementary Note 14)

An unmanned vehicle control system including:
  an unmanned vehicle belonging to an unmanned vehicle group including a plurality of unmanned vehicles; and
  a control device capable of communicating with the unmanned vehicle,
  in which the control device
  receives an activity situation of the unmanned vehicle,
  receives an input of a constraint condition related to an activity amount of the unmanned vehicle group,
  calculates a value of the activity amount of the unmanned vehicle in the unmanned vehicle group based on the constraint condition and the activity situation of the unmanned vehicle,
  calculates the activity amount of the unmanned vehicle based on the value, the constraint condition, and the activity situation of the unmanned vehicle, and
  transmits the activity amount calculated by the activity amount calculation means to the unmanned vehicle.

(Supplementary Note 15)

An unmanned vehicle control method to be executed by a control device capable of communicating with an unmanned vehicle belonging to an unmanned vehicle group including a plurality of unmanned vehicles, the method including:
  receiving an activity situation of the unmanned vehicle;
  receiving an input of a constraint condition related to an activity amount of the unmanned vehicle group;
  calculating a value of the activity amount of the unmanned vehicle in the unmanned vehicle group based on the constraint condition and the activity situation of the unmanned vehicle;
  calculating the activity amount of the unmanned vehicle based on the value, the constraint condition, and the activity situation of the unmanned vehicle; and
  transmitting the activity amount calculated by the activity amount calculation means to the unmanned vehicle.

(Supplementary Note 16)

An unmanned vehicle control system that controls an unmanned vehicle belonging to an unmanned vehicle group including a plurality of unmanned vehicles, the system including:
  input receiving means configured to receive an input of a constraint condition related to an activity amount of the unmanned vehicle group; and
  control means configured to control a host vehicle based on the constraint condition received by the receiving means and an activity situation of the host vehicle.

(Supplementary Note 17)

The unmanned vehicle control system according to Supplementary Note 16, further including:
  value calculation means configured to calculate a value of the activity amount of the unmanned vehicle in the unmanned vehicle group based on the constraint condition received by the input receiving means and the activity situation of the unmanned vehicle received by the receiving means; and
  activity amount calculation means configured to calculate the activity amount of the unmanned vehicle based on the value calculated by the value calculation means, the constraint condition, and the activity situation of the unmanned vehicle.

(Supplementary Note 18)

The unmanned vehicle control system according to Supplementary Note 16 or 17,
  in which the receiving means further receives an activity situation of another unmanned vehicle from the another unmanned vehicle, and
  the value calculation means calculates a value of the activity amount of the unmanned vehicle further based on the activity situation of the another unmanned vehicle received by the receiving means.

(Supplementary Note 19)

The unmanned vehicle control system according to any one of Supplementary Notes 16 to 18, further including:
  generation means configured to generate control information for controlling the unmanned vehicle based on the activity amount calculated by the activity amount calculation means,
  in which the transmitting means transmits control means generated by the generation means to the unmanned vehicle.

INDUSTRIAL APPLICABILITY

The present invention can be applied to solutions and products in which a person, an unmanned vehicle, and an unmanned vehicle group cooperate and cooperate with each other.

REFERENCE SIGNS LIST 10 terminal device
11 input receiving means
12 transmitting means
20 communication net
30 unmanned vehicle
31 receiving means
32 control means
33 value calculation means
34 activity amount calculation means
35 transmitting means
36 generation means
40 cloud
41 server
42 database
11A send button
11B send button
3A check box
3B unmanned vehicle identifier
3C communicable unmanned vehicle identifier
3D unmanned vehicle group identifier
100 unmanned vehicle control device
101 receiving means
102 input receiving means
103 value calculation means
104 activity amount calculation means
105 generation means
106 transmitting means
200 communication net
300 unmanned vehicle
301 receiving means
302 control means
303 transmitting means
900 computer
901 CPU
902 ROM
903 RAM
904A program 904B recording information
905 recording device
906 recording medium
907 drive device
908 communication interface
909 communication network
910 input and output interface
911 bus

What is claimed is:

1. An unmanned vehicle belonging to an unmanned vehicle group including a plurality of unmanned vehicles, the unmanned vehicle comprising:
at least one memory storing instructions; and
at least one processor configured to access the at least one memory and execute the instructions to:
receive a constraint condition related to an activity amount of the unmanned vehicle group and an activity situation of the unmanned vehicles other than a host vehicle in the unmanned vehicle group;
calculate a value of the activity amount for each of the unmanned vehicles in the unmanned vehicle group based on the received constraint condition, an activity situation of the host vehicle, and the received activity situation of the unmanned vehicles other than the host vehicle in the unmanned vehicle group;
calculate the activity amount of the host vehicle based on the constraint condition by using a nonlinear function that defines a relationship between the value of the activity amount of unmanned vehicles and activity amount of the unmanned vehicles in the unmanned vehicle group; and
control the host vehicle based on the received constraint condition, an activity situation of the host vehicle, and the calculated activity amount.

2. The unmanned vehicle according to claim 1,
wherein the at least one processor is further configured to execute the instructions to:
receive an activity situation of another unmanned vehicle from the another unmanned vehicle; and
calculate the value of the activity amount of the host vehicle further based on the received activity situation of the another unmanned vehicle.

3. The unmanned vehicle according to claim 2, wherein the at least one processor is further configured to execute the instructions to:
generate control information for controlling the host vehicle based on the activity amount; and
transmit the generated control information to the another unmanned vehicle.

4. The unmanned vehicle according to claim 2,
wherein the at least one processor is further configured to execute the instructions to:
preform reception every predetermined period;
calculate the value of the activity amount of the host vehicle every predetermined period; and
calculate the activity amount of the host vehicle every predetermined period.

5. A control method performed by an unmanned vehicle belonging to an unmanned vehicle group including a plurality of unmanned vehicles, the method comprising:
receiving a constraint condition related to an activity amount of the unmanned vehicle group and an activity situation of the unmanned vehicles other than a host vehicle in the unmanned vehicle group;
calculating a value of the activity amount for each of the unmanned vehicles in the unmanned vehicle group based on the received constraint condition, an activity situation of the host vehicle, and the received activity situation of the unmanned vehicles other than the host vehicle in the unmanned vehicle group;
calculating the activity amount of the host vehicle based on the constraint condition by using a nonlinear function that defines a relationship between the value of the activity amount of unmanned vehicles and activity amount of the unmanned vehicles in the unmanned vehicle group; and
controlling the host vehicle based on the received constraint condition, an activity situation of the host vehicle, and the calculated activity amount.

6. A non-transitory recording medium storing a program executable by an unmanned vehicle belonging to an unmanned vehicle group including a plurality of unmanned vehicles to perform processing comprising:
receiving a constraint condition related to an activity amount of the unmanned vehicle group and an activity situation of the unmanned vehicles other than a host vehicle in the unmanned vehicle group;
calculating a value of the activity amount for each of the unmanned vehicles in the unmanned vehicle group based on the received constraint condition, an activity situation of the host vehicle, and the received activity situation of the unmanned vehicles other than the host vehicle in the unmanned vehicle group;
calculating the activity amount of the host vehicle based on the constraint condition by using a nonlinear function that defines a relationship between the value of the activity amount of unmanned vehicles and activity amount of the unmanned vehicles in the unmanned vehicle group; and
controlling the host vehicle based on the received constraint condition, an activity situation of the host vehicle, and the calculated activity amount.

7. The unmanned vehicle according to claim 1, wherein the at least one processor is further configured to execute the instructions to:
generate control information for controlling the host vehicle based on the activity amount; and
control the host vehicle further based on the control information, wherein
the control information is speed, acceleration, angular velocity, or rotation speed of a propeller or wheel for controlling an actuator to change a position of the host vehicle.

8. The unmanned vehicle according to claim 1, wherein the at least one processor is further configured to execute the instructions to:
calculate the value of the activity amount based on a distance between a target object and each unmanned vehicle, an area that can be patrolled per unit time, or a number of areas that can be patrolled per unit time, wherein
the value of the activity amount is a numerical value indicating how useful the activity amount of the host vehicle is in order for the plurality of unmanned vehicles to achieve a task.

* * * * *